Patented Jan. 2, 1940

2,185,480

UNITED STATES PATENT OFFICE 2,185,480

NITROGENOUS CONDENSATION PRODUCTS AND PROCESS OF PRODUCING THE SAME

Heinrich Ulrich and Karlhugo Kuespert, Ludwigshafen-on-the-Rhine, Germany, assignors to I. G. Farbenindustrie Aktiengesellschaft, Frankfort-on-the-Main, Germany No Drawing. Application November 26, 1937, Serial No. 176,654. In Germany December 3, 1936

14 Claims. (Cl. 260—458)

The present invention relates to new valuable nitrogenous condensation products and a process of producing same.

We have found that valuable nitrogenous condensation products can be prepared by causing an alkylene imine containing at least one hydrogen atom attached to nitrogen (which expression includes the monomeric alkylene imines and their polymerization products) to react with an ester the components of which are an alcohol containing at least 6 carbon atoms in the molecule and an inorganic acid containing oxygen. Suitable alkylene imines are for example ethylene imine, propylene imine, butylene imine, dodecylene imine and C-phenylethylene imine. Such alkylene imines may be prepared for example according to application Ser. No. 76,124, filed in the name of H. Ulrich on April 24, 1936. The polymerization products of the alkylene imines may be produced for example according to application Ser. No. 76,260, filed on April 24, 1936, in the names of H. Ulrich and W. Harz.

As ester components there may be mentioned the esters of inorganic oxygen-containing acids, in particular sulphuric acid, phosphoric acid and boric acid, with primary, secondary or tertiary aliphatic alcohols containing at least 6 carbon atoms in the molecule or cycloaliphatic or mixed aliphatic-aromatic alcohols, amino alcohols of the said size of molecule, phenols and the hydroxyalkylation products or other substitution products, for example the halogen substitution products, of the said compounds. If the esters still contain groups capable of salt-formation they may also be used in the form of salts, especially of their alkali or ammonium salts. There may be mentioned for example the sodium or potassium salts of octadecyl sulphuric acid ester, of octadecenyl phosphoric acid ester and of hydroabietinyl boric acid ester. The esters of alcohol mixtures corresponding to naturally occurring fatty acid mixtures, as for example the alcohols obtainable by the reduction of palm kernel fatty acids and the esters of the alcohol mixtures obtainable directly in the oxidation of paraffin waxes or by reduction of the paraffin wax oxidation products, may also be used with advantage.

The condensation is usually carried out at elevated temperature, generally speaking between 50° and 200° C. It may be carried out in the absence or presence of solvents or diluents, as for example water or alcohols. It is often advantageous to work in closed vessels, especially when solvents or diluents are used. The reaction may be effected in the presence of additional substances, for example of acid-binding agents, such as alkali metal hydroxides.

The products obtainable according to this invention possess a basic character. They are usually soluble in mineral acids or organic acid. They are very suitable for the purpose of improving textiles.

The following examples will further illustrate the nature of this invention but the invention is not restricted to these examples. The parts are by weight.

Example 1

43 parts of monomeric ethylene imine and 72 parts of a paste consisting of 55 per cent of the sodium salt of the sulphuric acid ester mixture of palm kernel fatty alcohols and 45 per cent of water are heated for 16 hours to boiling with 80 parts of 50 per cent caustic soda solution under reflux. A layer separates out which becomes solid at ordinary temperature and which is freed from excessive monomeric ethylene imine by distillation. A basic compound is obtained the salts of which are soluble in water and possess an excellent foaming power.

Example 2

43 parts of monomeric ethylene imine, 720 parts of a product consisting of 55 per cent of the sodium salt of the sulphuric acid ester mixture of palm kernel fatty alcohols and 45 per cent of water are heated for 12 hours in a stirring autoclave at 150° C. together with 80 parts of 50 per cent caustic soda solution. After removing the lower layer consisting essentially of Glauber's salt solution, a base is obtained which is swellable in water and may be used with advantage for animalizing cellulosic fibres.

Example 3

410 parts of an aqueous paste of the sodium salt of octodecenyl sulphuric acid ester and 45 parts of monomeric ethylene imine are heated for 12 hours in an autoclave at from 150° to 160° C. When the reaction mixture is mixed with water in order to remove the salts formed in the reaction a water-in-soluble base separates out which on addition of formic acid dissolves in water. The product obtained may be employed as a textile assisting agent.

Example 4

430 parts of polymeric ethylene imine and 720 parts of a 55 per cent aqueous paste of the sodium salt of the sulphonate mixture obtainable from palm kernel fatty alcohols are heated at from 100° to 120° C. while stirring until the initially turbid, foamy mixture has become practically clear.

The resulting product is soluble in water, foams very strongly and has excellent emulsifying properties. It is eminently suitable for animalizing vegetable spun fibres and artificial silk, as well as of fabrics from such fibres.

Polyethylene polyamines, as for example pentaethylene hexamine, may be used instead of polymerized ethylene imine.

*Example 5*

430 parts of polymeric ethylene imine and 740 parts of octodecyl sulphuric acid sodium salt are heated at 130° C. for 4 hours while stirring. A solid mass capable of swelling and emulsification in water is obtained which may be used with advantage as an addition to masses suitable for spinning; it imparts to the latter the property of yielding fibres well capable of being dyed with wool dyestuffs.

If octodecenyl sulphuric acid sodium salt be used instead of octodecyl sulphuric acid sodium salt, water soluble products are obtained.

*Example 6*

430 parts of polymeric ethylene imine and 365 parts of hydroabietinyl boric acid ester are heated at from about 100° to 120° C. until a homogeneous mass has been formed. The resulting pale yellow product dissolves in water to give an incompletely clear solution.

What we claim is:

1. The process for producing nitrogenous products, which comprises condensing an alkylene imine containing at least one hydrogen atom attached to nitrogen, with an ester the components of which are an alcohol containing at least 6 carbon atoms in the molecule and an inorganic polybasic acid containing oxygen.

2. The process for producing nitrogenous products, which comprises condensing a monomeric alkylene imine containing at least one hydrogen atom attached to nitrogen, with an ester the components of which are an alcohol containing at least 6 carbon atoms in the molecule and an inorganic polybasic acid containing oxygen.

3. The process for producing nitrogenous products, which comprises condensing a polymeric alkylene imine containing at least one hydrogen atom attached to nitrogen, with an ester the components of which are an alcohol containing at least 6 carbon atoms in the molecule and an inorganic polybasic acid containing oxygen.

4. The process for producing nitrogenous products, which comprises condensing an alkylene imine containing at least one hydrogen atom attached to nitrogen, in the presence of a diluent with an ester the components of which are an alcohol containing at least 6 carbon atoms in the molecule and an inorganic polybasic acid containing oxygen.

5. The process for producing nitrogenous products, which comprises condensing an alkylene imine containing at least one hydrogen atom attached to nitrogen in the presence of an acid-binding agent with an ester the components of which are an alcohol containing at least 6 carbon atoms in the molecule and an inorganic polybasic acid containing oxygen.

6. The process for producing nitrogenous products, which comprises condensing an alkylene imine containing at least one hydrogen atom attached to nitrogen, with a sulphuric acid ester of an alcohol containing at least 6 carbon atoms in the molecule.

7. The process for producing nitrogenous products, which comprises condensing ethylene imine within an ester the components of which are an alcohol containing at least 6 carbon atoms in the molecule and an inorganic polybasic acid containing oxygen.

8. The process for producing nitrogenous products, which comprises condensing polymeric ethylene imine with an ester the components of which are an alcohol containing at least 6 carbon atoms in the molecule and an inorganic polybasic acid containing oxygen.

9. Nitrogenous condensation products of an alkylene imine containing at least one hydrogen atom attached to nitrogen and an ester the components of which are an alcohol containing at least 6 carbon atoms in the molecule and an inorganic polybasic acid containing oxygen.

10. Nitrogenous condensation products of a monomeric alkylene imine containing at least one hydrogen atom attached to nitrogen and an ester the components of which are an alcohol containing at least 6 carbon atoms in the molecule and an inorganic polybasic acid containing oxygen.

11. Nitrogenous condensation products of a polymeric alkylene imine containing at least one hydrogen atom attached to nitrogen and an ester the components of which are an alcohol containing at least 6 carbon atoms in the molecule and an inorganic polybasic acid containing oxygen.

12. Nitrogenous condensation products of an alkylene imine containing at least one hydrogen atom attached to nitrogen and a sulphuric acid ester of an alcohol containing at least 6 carbon atoms in the molecule.

13. Nitrogenous condensation products of monomeric ethylene imine and an ester the components of which are an alcohol containing at least 6 carbon atoms in the molecule and an inorganic polybasic acid containing oxygen.

14. Nitrogenous condensation products of polymeric ethylene imine and an ester the components of which are an alcohol containing at least 6 carbon atoms in the molecule and an inorganic polybasic acid containing oxygen.

HEINRICH ULRICH.
KARLHUGO KUESPERT.